United States Patent
Hurwitz

(10) Patent No.: US 8,885,814 B2
(45) Date of Patent: Nov. 11, 2014

(54) FEEDBACK IMPEDANCE CONTROL FOR DRIVING A SIGNAL

(75) Inventor: Jonathan Ephraim David Hurwitz, Edinburgh (GB)

(73) Assignee: Broadcom Europe Limited, London (GB)

( * ) Notice: Subject to any disclaimer, the term of this patent is extended or adjusted under 35 U.S.C. 154(b) by 1924 days.

(21) Appl. No.: 11/493,292

(22) Filed: Jul. 25, 2006

(65) Prior Publication Data
US 2008/0043992 A1    Feb. 21, 2008

(51) Int. Cl.
*H04M 3/00* (2006.01)
*H04B 3/54* (2006.01)

(52) U.S. Cl.
CPC .......... *H04B 3/54* (2013.01); *H04B 2203/5425* (2013.01)
USPC .......................................... 379/386; 379/394

(58) Field of Classification Search
CPC ....... H04M 3/30; H04M 11/06; H04M 12/12; H04M 11/002; H04M 3/18; H04M 1/6008; H04M 9/10; H04M 9/08; H04M 1/60; H04M 3/005; H04Q 1/46
USPC ........... 379/386, 394, 398, 30, 399.01, 93.36, 379/102.04, 106.04, 322, 388.03, 388.05, 379/388.07, 390, 390.01, 390.03, 395, 379/395.01; 381/120, 121
See application file for complete search history.

(56) References Cited

U.S. PATENT DOCUMENTS

| | | | | |
|---|---|---|---|---|
| 3,379,973 A | * | 4/1968 | Walton | 324/706 |
| 3,445,763 A | * | 5/1969 | Harris, Jr. | 324/651 |
| 3,612,993 A | * | 10/1971 | Tims et al. | 324/650 |
| 4,096,361 A | * | 6/1978 | Crawford | 379/403 |
| 4,224,483 A | * | 9/1980 | Neigh et al. | 379/30 |
| 4,242,631 A | * | 12/1980 | Hall | 324/649 |
| 4,283,675 A | * | 8/1981 | Sparber | 324/650 |
| 4,622,660 A | * | 11/1986 | Cowans et al. | 369/134 |
| 4,636,711 A | | 1/1987 | Freymuth | |
| 4,636,771 A | | 1/1987 | Ochs | |
| 4,772,870 A | | 9/1988 | Reyes | |

(Continued)

FOREIGN PATENT DOCUMENTS

| EP | 0580457 A1 | 1/1994 |
|---|---|---|
| EP | 1134909 A1 | 9/2001 |

(Continued)

OTHER PUBLICATIONS

Yukitoshi, Sanada, A Multiuser Interference Cancellation Technique Utilizing Convolutional Colds and Orthogonal Multicarrier Modulation for Wireless Indoor Communications, IEEE Journal of Selected Areas in Communications, vol. 14, No. 8, Oct. 1996, pp. 1500-1508.

(Continued)

*Primary Examiner* — Akelaw Teshale
(74) *Attorney, Agent, or Firm* — Garlick & Markison; Holly L. Rudnick

(57) ABSTRACT

A system for driving a first signal onto a wireline includes a driver and feedback circuitry. The driver drives a deterministic signal onto the wireline with an unknown impedance load. The feedback circuitry measures a quality of the output signal from the wireline and modifies a signal strength of the first signal based on the quality of the output signal. The driver then drives the first signal onto the wireline with the modified signal strength.

25 Claims, 6 Drawing Sheets

(56) References Cited

U.S. PATENT DOCUMENTS

| | | | |
|---|---|---|---|
| 4,922,534 A | 5/1990 | Gorniak et al. | |
| 5,264,798 A * | 11/1993 | Bey et al. | 324/725 |
| 5,287,065 A * | 2/1994 | Allfather | 324/651 |
| 5,574,748 A | 11/1996 | Vander Mey et al. | |
| 5,589,763 A * | 12/1996 | Burns | 324/76.15 |
| 5,732,223 A | 3/1998 | Moore et al. | |
| 5,777,475 A * | 7/1998 | Vester | 324/322 |
| 5,777,544 A | 7/1998 | Vander Mey et al. | |
| 5,880,631 A | 3/1999 | Sahota | |
| 5,929,750 A | 7/1999 | Brown | |
| 5,929,896 A | 7/1999 | Goodman et al. | |
| 5,933,071 A | 8/1999 | Brown | |
| 5,978,371 A | 11/1999 | Mason et al. | |
| 6,014,386 A | 1/2000 | Abraham | |
| 6,215,987 B1 | 4/2001 | Fujita | |
| 6,243,413 B1 | 6/2001 | Beukema | |
| 6,353,628 B1 | 3/2002 | Wallace et al. | |
| 6,373,377 B1 | 4/2002 | Sacca et al. | |
| 6,407,987 B1 | 6/2002 | Abraham | |
| 6,411,163 B1 | 6/2002 | Enriquez | |
| 6,518,839 B2 | 2/2003 | Gibson | |
| 6,593,868 B2 | 7/2003 | Clara et al. | |
| 6,828,806 B1 * | 12/2004 | Hirota et al. | 324/688 |
| 6,888,485 B2 | 5/2005 | Splett et al. | |
| 6,906,932 B2 * | 6/2005 | Kung et al. | 363/21.07 |
| 6,957,086 B2 | 10/2005 | Bahl et al. | |
| 6,985,715 B2 | 1/2006 | Lee | |
| 6,998,962 B2 | 2/2006 | Cope et al. | |
| 7,005,943 B2 | 2/2006 | Cern | |
| 7,042,351 B2 | 5/2006 | Kline | |
| 7,053,756 B2 | 5/2006 | Mollenkopf et al. | |
| 7,075,414 B2 | 7/2006 | Giannini et al. | |
| 7,079,537 B1 | 7/2006 | Kanuri et al. | |
| 7,221,196 B2 | 5/2007 | Shirani | |
| 7,248,148 B2 | 7/2007 | Kline et al. | |
| 7,269,403 B1 | 9/2007 | Miao | |
| 7,330,143 B2 | 2/2008 | Kim et al. | |
| 7,391,317 B2 | 6/2008 | Abraham et al. | |
| 7,417,463 B1 | 8/2008 | Danesh et al. | |
| 7,602,220 B1 | 10/2009 | Bofill-Petit | |
| 7,626,424 B2 | 12/2009 | Danesh et al. | |
| 7,725,096 B2 | 5/2010 | Riveiro et al. | |
| 7,808,985 B2 | 10/2010 | Romero | |
| 7,860,146 B2 | 12/2010 | Molina | |
| 7,899,436 B2 | 3/2011 | Riveiro | |
| 2001/0053207 A1 | 12/2001 | Jeon et al. | |
| 2002/0010870 A1 | 1/2002 | Gardner | |
| 2002/0026528 A1 | 2/2002 | Lo | |
| 2002/0145996 A1 | 10/2002 | Robinson et al. | |
| 2002/0154010 A1 | 10/2002 | Kline | |
| 2002/0174423 A1 | 11/2002 | Fifield et al. | |
| 2002/0181437 A1 | 12/2002 | Ohkubo et al. | |
| 2003/0016123 A1 | 1/2003 | Tager et al. | |
| 2003/0062990 A1 | 4/2003 | Shaeffer, Jr. et al. | |
| 2003/0114153 A1 | 6/2003 | Shaver et al. | |
| 2003/0129978 A1 | 7/2003 | Akiyama et al. | |
| 2003/0133473 A1 | 7/2003 | Manis et al. | |
| 2003/0156367 A1 * | 8/2003 | Macbeth | 361/38 |
| 2003/0169155 A1 | 9/2003 | Mollenkopf et al. | |
| 2003/0184433 A1 | 10/2003 | Zalitzky et al. | |
| 2003/0203721 A1 | 10/2003 | Berezdivin et al. | |
| 2003/0224728 A1 | 12/2003 | Heinonen et al. | |
| 2003/0227373 A1 | 12/2003 | Lou et al. | |
| 2004/0003338 A1 | 1/2004 | Kostoff et al. | |
| 2004/0022304 A1 | 2/2004 | Santhoff et al. | |
| 2004/0032320 A1 | 2/2004 | Zalitzky et al. | |
| 2004/0047427 A1 | 3/2004 | Dostert et al. | |
| 2004/0056734 A1 | 3/2004 | Davidow | |
| 2004/0077353 A1 | 4/2004 | Mahany | |
| 2004/0107588 A1 | 6/2004 | Pu | |
| 2004/0113756 A1 | 6/2004 | Mollenkopf | |
| 2004/0113757 A1 | 6/2004 | White, II et al. | |
| 2004/0174851 A1 | 9/2004 | Zalitzky et al. | |
| 2004/0213237 A1 | 10/2004 | Yasue et al. | |
| 2004/0220766 A1 * | 11/2004 | Harbord et al. | 702/124 |
| 2004/0246107 A1 | 12/2004 | Kline | |
| 2005/0018668 A1 | 1/2005 | Cheriton | |
| 2005/0020227 A1 * | 1/2005 | Kumagawa et al. | 455/234.1 |
| 2005/0031047 A1 | 2/2005 | Maltsev et al. | |
| 2005/0089061 A1 | 4/2005 | Logvinov et al. | |
| 2005/0094647 A1 | 5/2005 | Hata et al. | |
| 2005/0107977 A1 * | 5/2005 | Edwards et al. | 702/118 |
| 2005/0141473 A1 | 6/2005 | Lim et al. | |
| 2005/0157670 A1 | 7/2005 | Tang et al. | |
| 2005/0162228 A1 * | 7/2005 | Putzeys | 330/251 |
| 2005/0174950 A1 | 8/2005 | Ayyagari | |
| 2005/0190826 A1 | 9/2005 | Van Bruyssel et al. | |
| 2005/0249245 A1 | 11/2005 | Hazani et al. | |
| 2006/0031477 A1 | 2/2006 | Ayyagari | |
| 2006/0038662 A1 | 2/2006 | White, II et al. | |
| 2006/0045066 A1 | 3/2006 | Choi et al. | |
| 2006/0097574 A1 | 5/2006 | Gidge et al. | |
| 2006/0106961 A1 | 5/2006 | Ebata et al. | |
| 2006/0120399 A1 | 6/2006 | Claret et al. | |
| 2006/0126617 A1 | 6/2006 | Cregg et al. | |
| 2006/0146866 A1 | 7/2006 | Horvath et al. | |
| 2006/0160505 A1 * | 7/2006 | Ichitsubo et al. | 455/127.1 |
| 2006/0176898 A1 | 8/2006 | Chan et al. | |
| 2006/0215691 A1 | 9/2006 | Kobayashi et al. | |
| 2006/0233101 A1 | 10/2006 | Luft et al. | |
| 2006/0270365 A1 * | 11/2006 | Kehlenbach | 455/114.3 |
| 2006/0291575 A1 | 12/2006 | Berkman et al. | |
| 2007/0002771 A1 | 1/2007 | Berkman et al. | |
| 2007/0008972 A1 | 1/2007 | Sifnatsch et al. | |
| 2007/0025386 A1 | 2/2007 | Riedel et al. | |
| 2007/0060151 A1 | 3/2007 | Lee | |
| 2007/0076595 A1 | 4/2007 | Lee et al. | |
| 2007/0076666 A1 | 4/2007 | Riveiro | |
| 2007/0120506 A1 * | 5/2007 | Grant | 315/312 |
| 2007/0229231 A1 | 10/2007 | Hurwitz | |
| 2008/0001801 A1 | 1/2008 | Nhuyen | |
| 2008/0130640 A1 | 6/2008 | Hurwitz | |
| 2008/0159358 A1 | 7/2008 | Ruiz | |
| 2009/0022175 A1 | 1/2009 | Logvinov et al. | |
| 2009/0128386 A1 | 5/2009 | Meynants et al. | |
| 2009/0232286 A1 | 9/2009 | Hurwitz | |
| 2009/0315700 A1 | 12/2009 | Hurwitz | |

FOREIGN PATENT DOCUMENTS

| | | |
|---|---|---|
| EP | 1351408 B1 | 10/2003 |
| EP | 1388954 A2 | 2/2004 |
| EP | 1531568 A1 | 5/2005 |
| EP | 1548974 A2 | 6/2005 |
| EP | 1432138 B1 | 9/2005 |
| WO | 0195518 A2 | 12/2001 |
| WO | 03015291 A2 | 2/2003 |
| WO | 03077443 A1 | 9/2003 |
| WO | 03092212 A1 | 11/2003 |
| WO | 2004100392 A1 | 11/2004 |
| WO | 2005039070 A2 | 4/2005 |
| WO | 2006017743 A2 | 2/2006 |
| WO | 2006074174 A1 | 7/2006 |

OTHER PUBLICATIONS

Gardner, S., et al., HomePlug Standard Brings Networking to the Home, CSD, Dec. 2000.

UPA—Universal Powerline Association, Frequently Asked Questions, date unknown.

Powerstream Technology Background, Adaptive Networks, Inc., 2002.

Stelts, Michael, CEPCA Standard Summary, 2006.

Digital Home Statndard, Universal Powerline Association (UAP), 2005.

Powerline Communications Systems—Access/In-home & In-home/In-home Coexistence Mechanism—General Specifications, Universal Powerline Association (UPA), Jun. 27, 2005.

Opera Technology Specification—Part 1, Open PLC European Research Alliance (Opera), Jan. 31, 2006.

Opera System Specification—Part 2, Open PLC European Research Alliance (Opera), Jan. 31, 2006.

(56) References Cited

OTHER PUBLICATIONS

HomePlug 1.0 Technology White Paper, HomePlug Powerline Alliance.
PCT/US09/48090 International Search Report and Written Opinion, mailed Dec. 2, 2009.
PCT/US09/60478 International Search Report and Written Opinion, mailed Nov. 18, 2009.
PCT/US09/60482 International Search Report and Written Opinion, mailed Dec. 2, 2009.
PCT/US10/24125 International Search Report and Written Opinion, mailed Apr. 15, 2010.
PCT/US07/24309 International Search Report and Written Opinion, mailed Jun. 25, 2010.
US 7,417,463 Prosecution History.
US 7,626,424 Prosecution History.
U.S. Appl. No. 12/581,547 Prosecution History.
International Search Report and Written Opinion, PCT/US10/49182, dated Nov. 3, 2010.
International Search Report and Written Opinion, PCT/US10/49184, dated Nov. 8, 2010.
International Search Report, PCT/US07/16736, dated May 22, 2008.
"Broadband Powerline Communications Systems, A Background Brief," Australian Communications Authority, Sep. 2003.
Crowley, Patrick et al., "Network Processor Design—Issues and Practices," vol. 1, pp. 1 and 11, Morgan Kaufmann Publishers, San Francisco, 2003.
Int'l Search Report, PCT/US2007/015508, Dated Jun. 28, 2008.
Int'l Preliminary Report on Patentability, PCT/US2007/015508, Dated Jan. 1, 2009.
Int'l Preliminary Report on Patentability, PCT/US2007/016736, Dated Jan. 27, 2009.
Int'l Search Report, PCT/GB2006/003665, Dated Mar. 12, 2007.
Written Opinion, PCT/GB2006/003665, Dated Apr. 3, 2008.
Int'l Search Report, PCT/US2008/00020, Dated Oct. 2, 2008.
Written Opinion, PCT/US2008/00020, Dated Apr. 14, 2008.
Int'l Search Report, PCT/GB2008/050364, Dated Aug. 18, 2008.
Int'l Search Report, PCT/GB2008/050365, Dated Aug. 3, 2008.
PCT/EP2009/057284 Int'l Search Report and Written Opinion, Dated Aug. 28, 2009.
HomePlug AV White Paper, HomePlug Powerline Alliance, 2005.
Juttner, A., et al., Tree Based Broadcast in Ad Hoc Networks, Sep. 9, 2004, pp. 1-21, Errisson Research, Traffic Analysis and Network Performance Laboratory, Budapest, Hungary.
Kouvatsos, D., et al., Broadcasting Methods in Ad Hoc Networks: An Overview, Proceeding of the 3rd International Working conference on Performance Modelling and Evaluation of Heterogeneous Networks, Jul. 20, 2005, pp. 1-14.

* cited by examiner

FEEDBACK IMPEDANCE CONTROL FOR DRIVING A SIGNAL

BACKGROUND

1. Technical Field

The present invention relates generally to driving a signal on a wireline and more particularly to feedback impedance control for driving a signal.

2. Description of Related Art

A line driver drives a signal that is suitable for transmission over a wired connection. The difficulty of driving a signal onto a wired connection increases when the impedance on the wired connection is unknown and dynamic. One example of wired connections is a powerline network used for communications such as a residential powerline.

One limitation with powerline is that the impedance of the network can be unknown. There are regulations and standards that specify emission and performance requirements for a device connected to the powerline for a known impedance such as 50 ohms. However, the actual impedance of powerline can have a wide range such as from 5 ohms to 300 ohms, both from one node to another node and within the frequency range utilized in the communications system. The impedance has a wide range because the impedance depends on the network topologies (e.g. star and ring), the wiring, the connections, and the devices or appliances plugged into the sockets of the powerline with the effects of reflections combining with the passive characteristics to make a complex impedance. Furthermore, the impedance of the powerline can be dynamic (i.e. change during operation). For example, a timer may turn on a heater, which significantly increases the load upon the powerline.

Another limitation is that the impedance changes with frequency. In a band of 2 MHz to 30 MHz, the impedance is different at 2 MHz than at 30 MHz. Plus, the impedances at the different frequencies behave like a complex load as opposed to a simple load such as a resistor.

Some wired communications systems use complex multi-carrier modulation schemes that put particular requirements on inter-carrier modulation interference to achieve performance or even pass regulations. In powerline, high density orthogonal frequency division multiplexing (OFDM) typically uses a large number of carriers such as greater than 200. The non-linearity in the line driver may cause interference, which can degrade the performance of the wireline (e.g. degrading signal-to-noise ratio in other carriers). This non-linearity in the line driver may cause problems for other modulation schemes.

A line driver can use two different basic drive schemes: voltage buffering and current steering, voltage buffering being the more common. The challenge with voltage buffering is to prevent distortion by trying to drive too much current for the design when the impedance is low. The challenge with current steering is to prevent distortion by generating too much voltage than was designed for when resistance is high.

SUMMARY OF THE INVENTION

The invention addresses the above problems by providing feedback impedance control for driving a signal. A system for driving a first signal onto a wireline includes a driver and feedback circuitry. The driver drives a deterministic signal onto the wireline with an unknown impedance load. The feedback circuitry measures a quality of the output signal from the wireline and modifies a signal strength of the first signal based on the quality of the output signal. The driver then drives the first signal onto the wireline with the modified signal strength.

The wireline may be a powerline. The feedback circuitry may modify the signal strength of the first signal by changing a gain of the first signal in a digital system. The feedback circuitry may modify the signal strength of the first signal by changing a gain of the first signal in an analog system. The feedback circuitry may modify the signal strength of the first signal by changing a gain of the first signal in a converter that converts between analog and digital. The feedback circuitry may measure the quality of the output signal from the wireline and modify the signal strength of the first signal based on the quality of the output signal until a desired performance of the first signal is achieved. In some embodiments, the feedback circuitry measures a distortion, voltage, and/or current of the output signal. The deterministic signal may comprise a test waveform but may also be part of the first signal.

A method of driving a first signal onto a wireline includes the step of driving a deterministic signal onto the wireline with an unknown impedance load. The method also includes the steps of measuring a quality of an output signal from the wireline and modifying the signal strength of the first signal based on the quality of the output signal. The method includes driving the first signal onto the wireline.

By providing feedback impedance control for driving a signal, the system advantageously can handle worst case scenarios when impedance is low or high. The system can also reduce power consumption by efficiently driving the signal onto the wireline. The system cab also meet standards or requirements for qualification loads and reduce distortion and inter-carrier interference. The system can also prevent signal degradation as the impedance changes during operation. The system may also be applied to different types of drive schemes such as voltage buffering and current steering.

DETAILED DESCRIPTION OF THE INVENTION

The embodiments discussed herein are illustrative of one example of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, these descriptions and drawings should not be considered in a limiting sense, as it is understood that the present invention is in no way limited to only the embodiments illustrated.

A system for driving a first signal onto a wireline includes a driver and feedback circuitry. The driver drives a deterministic signal onto the wireline with an unknown impedance load. The feedback circuitry measures a quality of an output signal from the wireline and modifies a signal strength of the first signal based on the quality of the output signal. The driver then drives the first signal onto the wireline.

By providing feedback impedance control for driving a signal, the system advantageously can handle worst case scenarios when impedance is low or high. The system can also reduce power consumption by efficiently driving the signal onto the wireline. The system can also meet standards or requirements for qualification loads and reduce distortion and inter-carrier interference. The system can also prevent signal degradation as the impedance changes during operation. The system may also be applied to different types of drive schemes such as voltage buffering and current steering. The system may also be used in low-voltage CMOS, where voltage and current may be limited.

Figure 1:
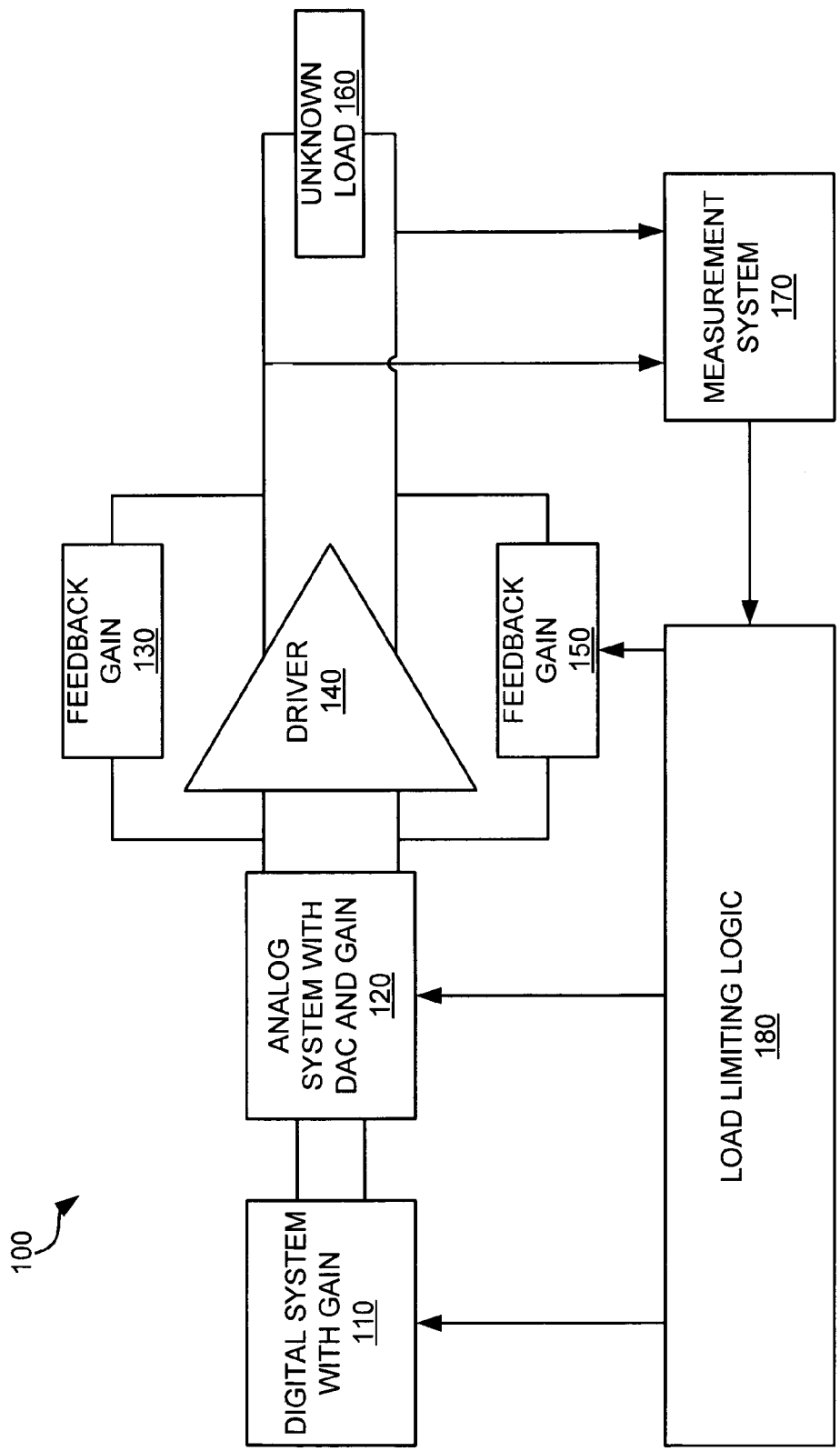
FIG. 1 is an illustration of a system for driving a signal in an exemplary implementation of the invention.

FIG. 1 depicts an illustration of a system 100 for driving a signal in an exemplary implementation of the invention. The system 100 includes a digital system 110, an analog system with a digital to analog converter (DAC) 120, feedback gain 130, driver 140, feedback gain 150, an unknown load 160, a measurement system 170, and load limiting logic 180.

The digital system 110 is coupled to the analog system 120. The analog system 120 is coupled to the feedback gains 130 and 150 and the input of the driver 140. The output of the driver 140 is coupled to the feedback gain 130 and 150, the unknown load 160, and the measurement system 170. The measurement system 170 is coupled to the load limiting logic 180. The load limiting logic 180 is coupled to the digital system 110, the analog system 120, and the feedback gain 150.

The digital system 110 is any digital circuitry with gain. The digital system 110 may generate a deterministic signal. A deterministic signal is any test or known signal. Some examples of a deterministic signal are a test waveform, a known waveform (e.g. the preamble already in the communications and within the first signal), and a probabilistically known signal (e.g. data of the first signal). The analog system 120 is any analog circuitry with gain. In this embodiment, the analog system 120 includes a DAC.

The driver 140 is any circuitry configured to drive a signal onto a wireline. The driver 140 may be a high frequency line driver. In some embodiments, the wireline comprises a powerline. The frequency range in the powerline may be 2-30 MHz. Another frequency range may be 50-300 MHz. The powerline may use an OFDM modulation scheme. The powerline may also use adaptative multi-carrier code division multiple access, which is disclosed in U.S. patent application entitled "Adaptative Multi-carrier Code Division Multiple Access" filed on Jul. 6, 2006, which is hereby incorporated by reference.

The feedback gain 130 and 150 are any circuitry that feeds the output of the driver 140 back into the input of the driver 140.

The unknown load 160 is any device or circuitry attached to the wireline that has an impedance that is unknown. The unknown load 160 may comprise speakers or other home entertainment equipment attached to a residential powerline. The unknown load 160 may also include other devices such as lights and appliances that plug into the residential powerline. In one example, the unknown load 160 could be between 5 ohms and 300 ohms.

The measurement system 170 is any circuitry or system configured to measure the quality of an output signal from the wireline. The measurement system 170 may measure current, voltage, distortion, signal-to-noise ratio, and/or heat. One measure of quality of the output signal is the distortion, which may be measured by signal-to-noise ratio by using a Fast Fourier Transform to determine signal content in the notches. The measurement system 170 may also directly or indirectly measure the operating point of the driver 140 such as the peak or average output current through a replica output stage. Also, an indirect measurement of the operating point may be temperature or voltage drop. In various embodiments, one or more measurements can be made to determine the quality of the signal.

The measurement and modification can occur continuously until the desired quality of the output signal is reached. The measurement and the following modification of the signal strength can occur at different times. The measurement and modification of the signal strength can occur on power-up or there can be a periodic measurement and modification (e.g. every few seconds). The measurement and modification can also be embedded in the normal communication system.

The load limiting logic 180 is any circuitry configured to modify the signal strength/swing of the signal. The load limiting logic 180 may modify the signal strength by changing the gain. The signal may be changed by changing the signal swing by scaling the signal. For example, when the impedance is 50 ohms, 4 volts is driven peak-to-peak. Above 50 ohms, 4 volts will continue to be driven peak-to-peak. When the impedance is 25 ohms, the measurement system 170 determines that a condition occurred such as too much current is being used or too much distortion based on the measured quality of the output signal. The load limiting logic 180 then changes the signal so that 2 volts is driven peak-to-peak until the desired quality is achieved. Thus, less signal is injected but the signal is still within the operating range of the driver 140. Thus, the signal strength is changed but still matches the capabilities of the driver 140.

The load limiting logic 180 may be a processor or circuitry executing software or firmware. The load limiting logic 180 may use state machines or real time calculations. The load limiting logic 180 could operate continuously or be decision based. The load limiting logic 180 may change the $R_{gain}$ of the digital system 110, the analog system 120, and the feedback gain 150 based on the current sensed. The gain may be changed in any circuitry that has input and outputs that are analog, digital, or a combination of analog and digital. Furthermore, the load limiting logic 180 that controls the gain change is digital but may also be an analog control system. The load limiting logic 180 may also change a multiplier or a DAC range setting, which could be greater than 4 bits.

The measurement system 170 and the load limiting logic 180 may be combined into a single feedback circuitry. The feedback circuitry is any circuitry configured to measure a quality of an output signal from the wireline and modify a signal strength of the first signal based on the quality of the output signal.

Figure 2:
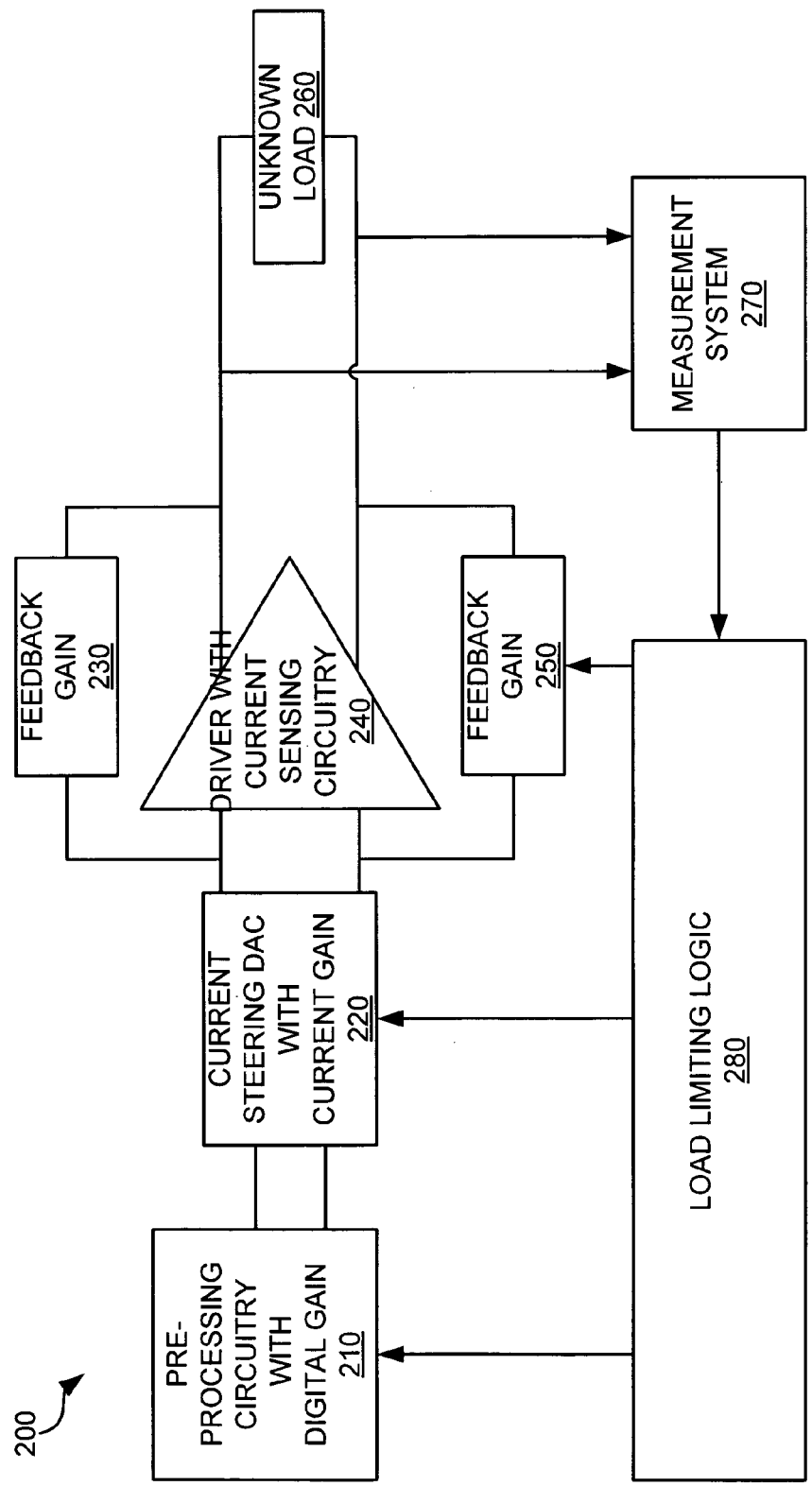
FIG. 2 is an illustration of a system for driving a signal with a voltage drive in an exemplary implementation of the invention.

FIG. 2 depicts an illustration of a system 200 for driving a signal with a voltage drive in an exemplary implementation of the invention. The system 200 includes a digital pre-processing circuitry 210, a current steering DAC 220, feedback gain 230, driver 240 with current sensing circuitry 240, feedback gain 250, an unknown load 260, a measurement system 270, and load limiting logic 280.

The pre-processing circuitry 210 is coupled to the current steering DAC 220. The current steering DAC 220 is coupled to the feedback gains 230 and 250 and the input of the driver 240. The output of the driver 240 is coupled to the feedback gain 230 and 250, the unknown load 260, and the measurement system 270. The measurement system 270 is coupled to the load limiting logic 280. The load limiting logic 280 is coupled to the pre-processing circuitry 210, the current steering DAC 220, and the feedback gain 250.

The pre-processing circuitry 210 has digital gain. The current steering DAC has current gain. The driver 240 includes current sensing circuitry in the output stage, which is described in further detail in FIG. 3.

Figure 3:
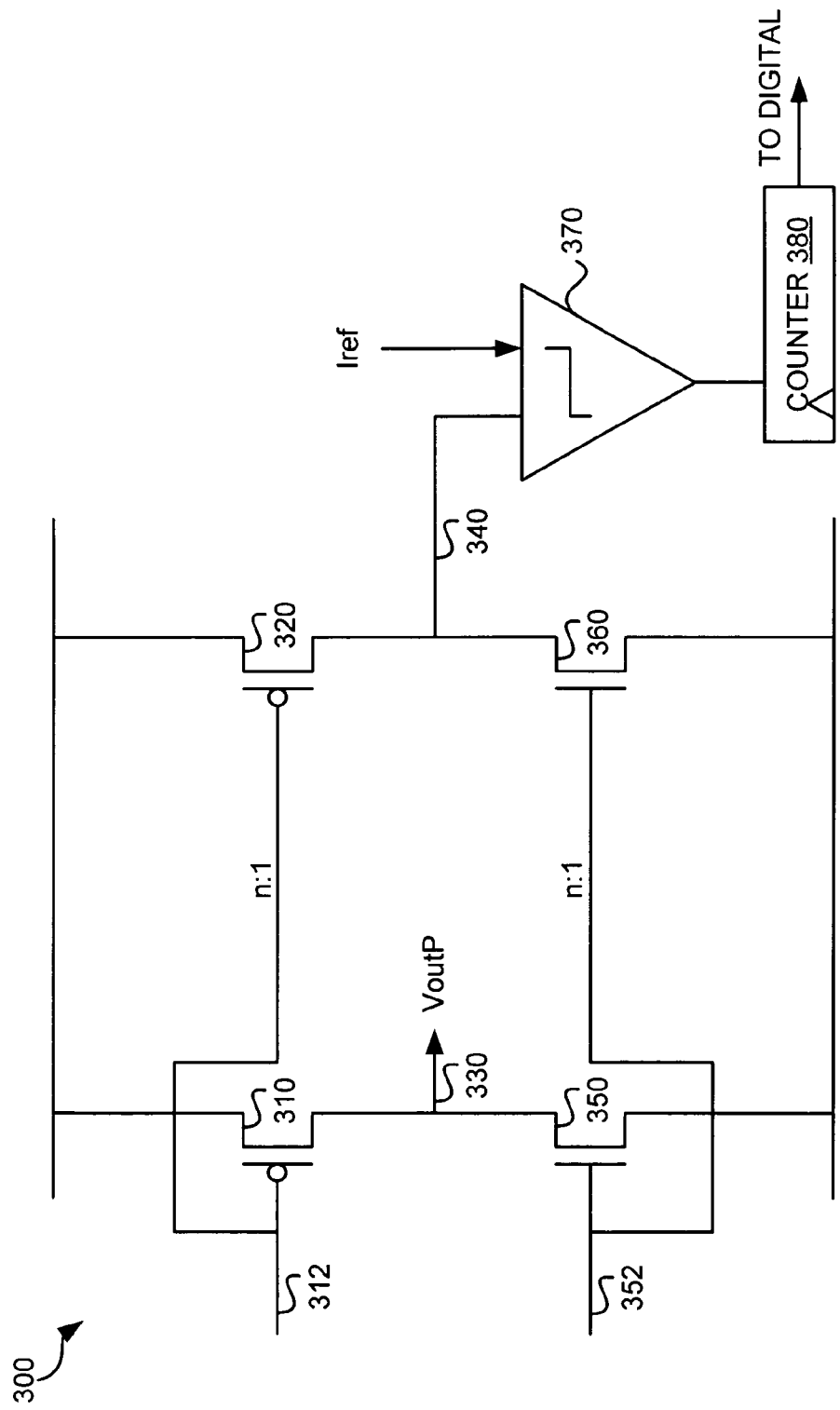
FIG. 3 is an illustration of current sensing circuitry in an exemplary implementation of the invention.

FIG. 3 depicts an illustration of current sensing circuitry 300 in an exemplary implementation of the invention. The current sensing circuitry 300 is located in the output stage of the driver 240 of FIG. 2. The current sensing circuitry 300 measures the current in the output stage of the driver 240 to determine the operating point of the driver 240. The output stage of the driver 240 is in a push-pull configuration.

The current sensing circuitry 300 comprises a PMOS transistor 310, a PMOS transistor 320, an NMOS transistor 350, an NMOS transistor 360, a comparator 370, and a counter 380. The sources of the PMOS transistors 310 and 320 are coupled to the source voltage. The gates of the PMOS transistors 310 and 320 are coupled to the input 312. The drains of the PMOS transistor 310 and the NMOS transistor 350 are coupled to the output VoutP 330. The gates of the NMOS transistors 350 and 360 are coupled to the input 352. The sources of the NMOS transistors 350 and 360 are coupled to ground. The drains of the PMOS transistor 320 and the NMOS transistor 360 are coupled to the input of the comparator 370. The output stage is formed from the PMOS transistor 310 and the NMOS transistor 350. The output stage is mirrored by the PMOS transistor 320 and the NMOS transistor 360. This mirror may operate at 100 times less current or some value n time less current than the output stage.

The other input of the comparator 370 is coupled to a link with a reference current, Iref. The comparator 370 compares the reference current and the output signal from the output stage. The output of the comparator 370 is coupled to the counter 380. The counter 380 counts the number of times the output signal from the output stage goes beyond the reference current. The output of the counter 380 is coupled to a digital output.

Figure 4:
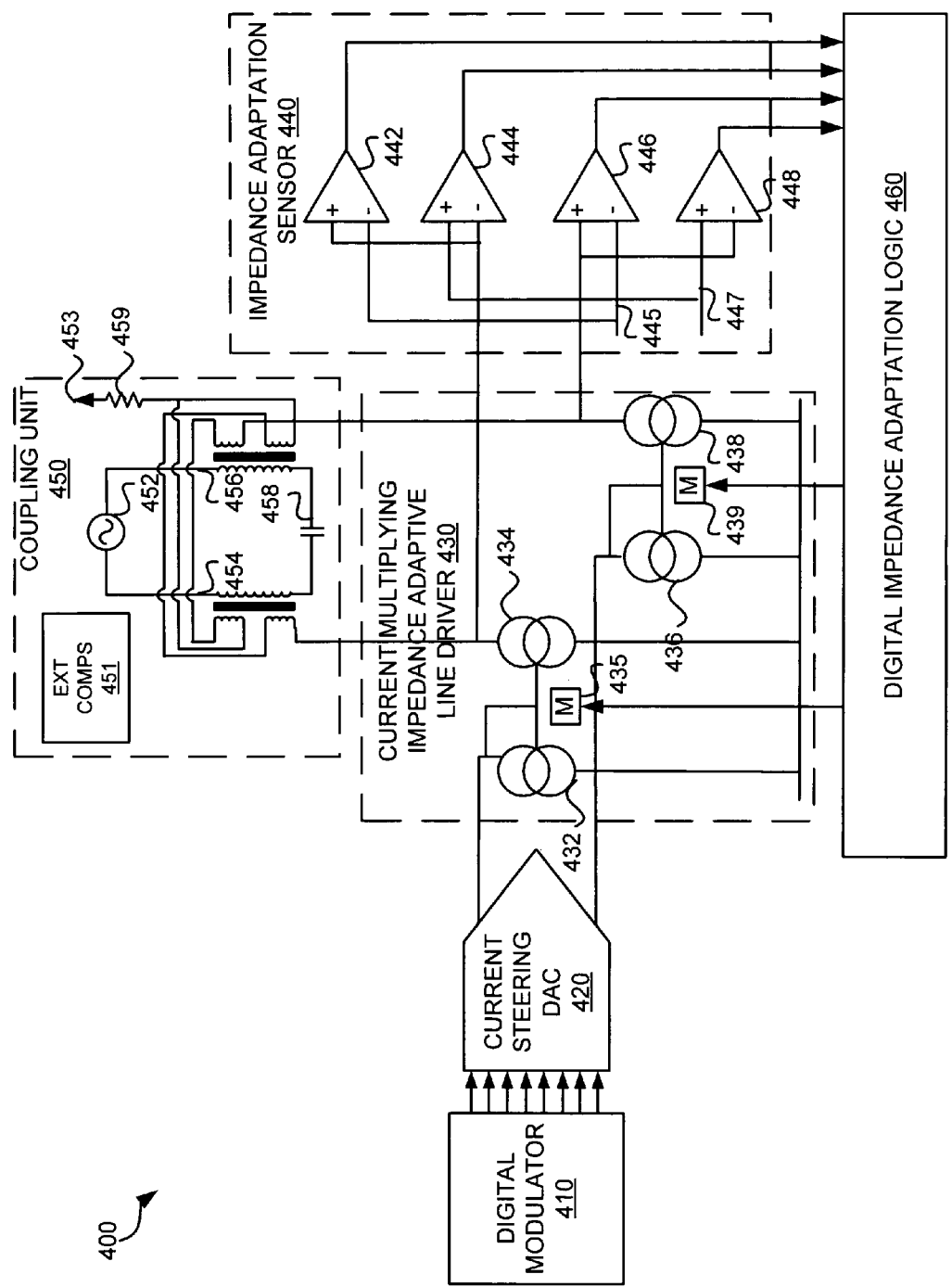
FIG. 4 is an illustration of a system with a current multiplying digital to analog converter and a comparator in an exemplary implementation of the invention.

FIG. 4 depicts an illustration of a system 400 with a current multiplying DAC and a comparator in an exemplary implementation of the invention. The system 400 comprises a digital modulator 410, a current steering DAC 420, a current multiplying impedance adaptive line driver 430, an impedance adaptation sensor 440, a coupling unit 450, and digital impedance adaptation logic 460. The digital modulator 410 is coupled to the current steering DAC 420.

The current multiplying impedance adaptive line driver 430 includes a transformer 432, a transformer 434, a multiplier 435, a transformer 436, a transformer 438, and a multiplier 439. The transformer 432, the transformer 434, and the multiplier 435 form a current mirror with a multiplier. The transformer 436, the transformer 438, and the multiplier 439 also form a current mirror with a multiplier. The current steering DAC 420 is coupled to the transformers 432, 434, and 436. The multipliers 435 and 439 are coupled to the digital impedance adaptation logic 460.

The coupling unit 450 includes external components 451, an AC power line 452, an analog $V_{DD}$ output 453, a transformer 454, a transformer 456, a coupling capacitor 458, and a DC biasing resistor 459. In this example, the coupling unit 450 couples to the powerline network. The coupling unit 450 refers the impedance from the powerline in the form of capacitance or inductance. In some embodiments, the transformer 454 and 456 may form a 2000V isolation high frequency signal transformer. The AC power line 452 and the coupling capacitor 458 are coupled to the transformers 454 and 456. One example of the coupling capacitor 458 is the Y1 class low filter bypass capacitor. The resistor 459 is coupled to the transformer 456. The resistor 459 can also be coupled to the analog $V_{DD}$.

The impedance adaptation sensor 440 includes comparators 442, 444, 446, and 448. The outputs of the comparators 442, 444, 446, and 448 are coupled to the digital impedance adaptation logic 460. The impedance adaptation sensor 440 senses whether the voltage is above or below a threshold. The impedance adaptation sensor 440 determines some of the voltage swing characteristics. For example, with the negative input of the comparator 446 coupled to an underdrive reference link 445 and the negative input of the comparator 448 coupled to a clipping reference link 447, the amount of time the signal spends between the underdrive voltage and the clipping reference can be determined. The impedance adaptation sensor 440 shown in FIG. 4 is really a type of analog to digital converter and may be replaced by one that may already be in the system, such as on the receiver path.

The system 400 employs a current buffer. In one example, the impedance of the powerline is 100 ohms. The current is 10 milliamps. The peak-to-peak is then 1 volt. If the impedance is 200 ohms and the current is 10 milliamps, the peak-to-peak is 2 volts. The digital impedance adaptation logic 460 can then detect there is too much voltage and change the multiplication factors in the multipliers 435 and 439 to change the current to 5 milliamps to make the peak-to-peak voltage 1 volt.

Figure 5:
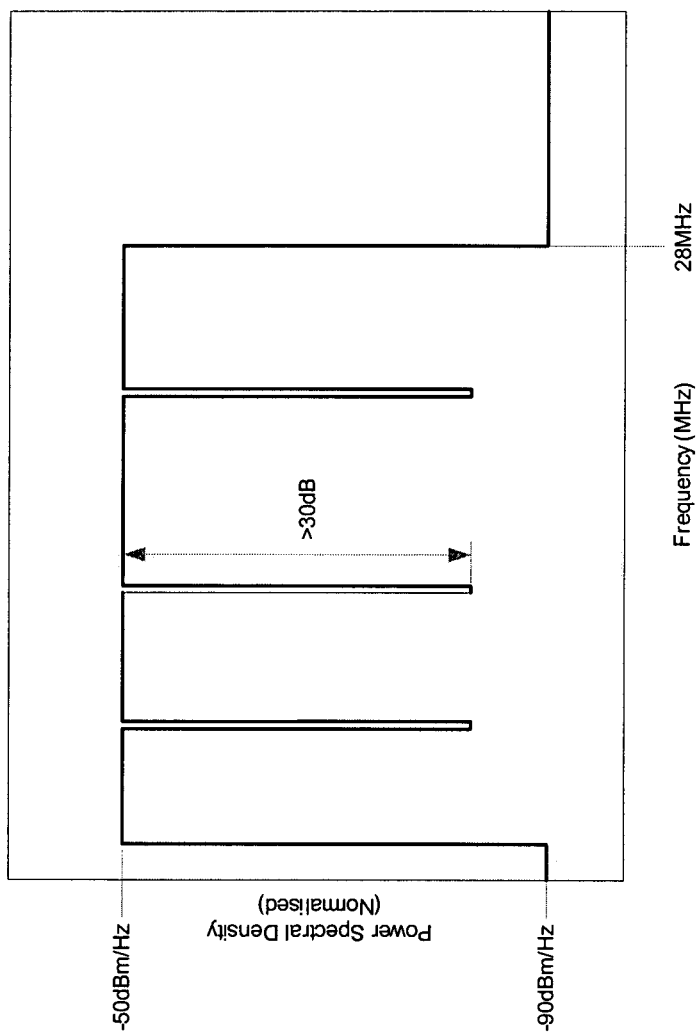
FIG. 5 is a graph of frequency (in MHz) vs. power spectral density (normalized).

FIG. 5 depicts a graph of frequency (in MHz) vs. power spectral density (normalized). This graph is an example of a standard requirement for power spectral density for powerline communications. The graph shows that there may be requirements to be 30 dB down or 40 dB down based on frequency. When distortion occurs, the frequencies are distorted from harmonics from adjacent frequencies would help fill in the notches.

Figure 6:
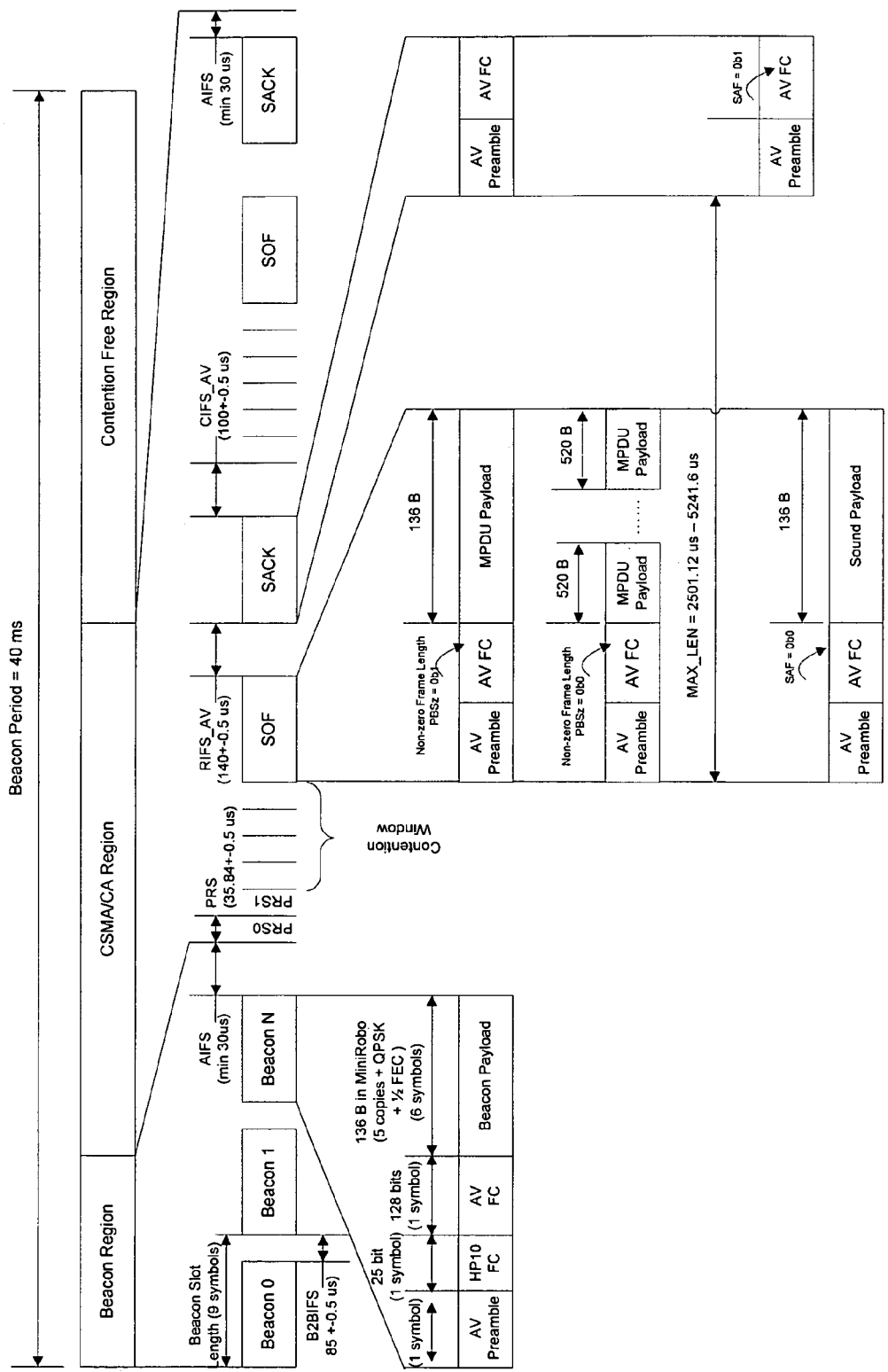
FIG. 6 is an illustration of data frame of a beacon period in an exemplary implementation of the invention.

FIG. 6 depicts an illustration of data frame of a beacon period in an exemplary implementation of the invention. The measurement of the deterministic signal could use parts of the data frame that is known. The measurement system 170 can measure characteristics of signals and perform a frame by frame comparison. If there is a change in the quality of the signal, the signal strength can then be modified.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A system for driving a first signal onto a wireline, the system comprising:
   a driver configured to drive a deterministic signal onto the wireline with an unknown impedance load and driving the first signal with a modified signal strength onto the wireline;
   a digital system coupled to an input of the driver and configured to produce the deterministic signal and the first signal; and feedback circuitry configured to measure a quality of an output signal from the wireline and modify the signal strength of the first signal based on the quality of the output signal by changing a gain of the first signal in the digital system;

wherein the wireline comprises a residential powerline used for communications.

2. The system of claim 1 wherein the feedback circuitry is configured to modify the signal strength of the first signal by changing a gain of the first signal in an analog system disposed between the digital system and the input of the driver.

3. The system of claim 1 wherein the feedback circuitry is configured to modify the signal strength of the first signal by changing a gain of the first signal in a converter that converts between analog and digital.

4. The system of claim 1 wherein the feedback circuitry is configured to measure the quality of the output signal from the wireline and modify the signal strength of the first signal based on the quality of the output signal until a desired performance of the first signal is achieved.

5. The system of claim 1 wherein the feedback circuitry is configured to measure the quality of the output signal by measuring a distortion of the output signal.

6. The system of claim 1 wherein the feedback circuitry is configured to measure the quality of the output signal by measuring a voltage of the output signal.

7. The system of claim 1 wherein the feedback circuitry is configured to measure the quality of the output signal by measuring a current of the output signal.

8. The system of claim 1 wherein the deterministic signal comprises a test waveform.

9. The system of claim 1 wherein the driver includes an input and an output and the system further comprises a feedback gain circuitry coupled between the output and the input.

10. The system of claim 1 wherein the driver includes an input and an output and wherein the feedback circuitry comprises a measurement system and load limiting logic, the measurement system being coupled between the output of the driver and the load limiting logic and wherein the measurement system is configured to measure the quality of the output signal.

11. The system of claim 1 further comprising an analog system including a digital to analog converter disposed between the digital system and the input of the driver.

12. The system of claim 11 wherein the analog system further includes a digital modulator disposed between the digital system and the digital to analog converter.

13. The system of claim 11 wherein the analog system further includes a current multiplying impedance adaptive line driver coupled between the digital to analog converter and an output of the driver.

14. The system of claim 13 wherein the analog system further includes an impedance adaptation sensor disposed between the current multiplying impedance adaptive line driver and the output of the driver.

15. The system of claim 13 further comprising a coupling unit configured to couple the current multiplying impedance adaptive line driver to an AC power line.

16. The system of claim 1 wherein the driver comprises current sensing circuitry.

17. A method of driving a first signal onto a wireline, the method comprising:

producing a deterministic signal and the first signal by a digital system;

driving the deterministic signal onto the wireline with an unknown impedance load;

measuring a quality of an output signal from the wireline;

modifying the signal strength of the first signal based on the quality of the output signal by changing a gain of the first signal in the digital system; and driving the first signal onto the wireline with the modified signal strength;

wherein the wireline comprises a residential powerline used for communications.

18. The method of claim 17 wherein modifying the signal strength of the first signal further comprises changing a gain of the first signal in an analog system disposed between the digital system and an input of a driver that drives the deterministic signal and the first signal onto the wireline.

19. The method of claim 17 wherein modifying the signal strength of the first signal further comprises changing a gain of the first signal in a converter that converts between analog and digital.

20. The method of claim 17 wherein measuring the quality of the output signal from the wireline and modifying the signal strength of the first signal based on the quality of the output signal occurs until a desired performance of the first signal is achieved.

21. The method of claim 17 wherein measuring the quality of the output signal comprises measuring a distortion of the output signal.

22. The method of claim 21 wherein measuring the distortion of the output signal includes measuring a signal-to-noise ratio by using a Fast Fourier Transform.

23. The method of claim 17 wherein measuring the quality of the output signal comprises measuring a voltage of the output signal.

24. The method of claim 17 wherein measuring the quality of the output signal comprises measuring a current of the output signal.

25. The method of claim 17 wherein the deterministic signal comprises a test waveform.

* * * * *